United States Patent [19]

Solomon

[11] Patent Number: 5,013,919

[45] Date of Patent: May 7, 1991

[54] DETECTOR ELEMENT SIGNAL COMPARATOR SYSTEM

[75] Inventor: Allen L. Solomon, Fullerton, Calif.

[73] Assignee: Grumman Aerospace Corporation, Bethpage, N.Y.

[21] Appl. No.: 422,731

[22] Filed: Oct. 17, 1989

[51] Int. Cl.⁵ .................................................. G01J 5/02
[52] U.S. Cl. .................................... 250/349; 250/332; 250/369
[58] Field of Search .......................... 250/332, 349, 369

[56] References Cited

U.S. PATENT DOCUMENTS

| | | | |
|---|---|---|---|
| 3,932,755 | 1/1976 | Sagawa | 250/349 |
| 4,612,442 | 9/1986 | Toshimichi | 250/353 |
| 4,618,763 | 10/1986 | Schmitz | 250/211 R |
| 4,633,086 | 12/1986 | Parrish | 250/338.1 |
| 4,659,931 | 4/1987 | Schmitz et al. | 250/338.4 |
| 4,692,610 | 9/1987 | Szuchy | 250/227.14 |
| 4,698,603 | 10/1987 | Clarius | 332/155 |
| 4,703,170 | 10/1987 | Schmitz | 250/211 R |
| 4,718,075 | 1/1988 | Horn | 378/91 |
| 4,734,577 | 3/1988 | Szuchy | 250/227.16 |
| 4,784,970 | 11/1988 | Solomon | 437/51 |
| 4,792,672 | 12/1988 | Schmitz | 250/211 R |
| 4,794,092 | 12/1988 | Solomon | 437/51 |
| 4,852,141 | 7/1989 | Horn | 378/147 |
| 4,959,809 | 9/1990 | Rogers et al. | 364/581 |

FOREIGN PATENT DOCUMENTS

| | | | |
|---|---|---|---|
| 59-60380 | 4/1984 | Japan | 250/369 |
| 60-146165 | 8/1985 | Japan | 250/349 |
| 63-44135 | 2/1988 | Japan | 250/349 |

Primary Examiner—Constantine Hannaher
Assistant Examiner—Jacob M. Eisenberg
Attorney, Agent, or Firm—Stetina and Brunda

[57] ABSTRACT

A detector element signal comparator system is used for noise reduction and image enhancement by comparing the output of any detector signal processor within a module to the output of any other detector signal processor within the same module. The detector element signal comparator system has a comparator for each detector signal processor, a comparator bus to connect the output of any detector signal processor to the comparators of all other detector signal processors, a switch for each detector signal processor to selectively connect each detector signal processor to the comparator bus, and an output bus for communicating the comparator signal from the detector element signal comparator to the next stage of signal processing.

17 Claims, 3 Drawing Sheets

DETECTOR ELEMENT SIGNAL COMPARATOR SYSTEM

FIELD OF THE INVENTION

The present invention relates generally to signal processing systems and more particularly to an infrared detector element signal comparator system used for noise reduction and image enhancement. The detector element signal comparator system compares the output of any detector signal processor within a module to the output of any other detector signal processor within the same module. The detector element signal comparator system has a comparator for each detector signal processor, a comparator bus to connect the output of any detector signal processor to the comparators of all other detector signal processors, a switch for each detector signal processor to selectively connect each detector signal processor to the comparator bus, and an output bus for communicating the comparator output from the detector element signal comparator to the next signal processing stage.

BACKGROUND OF THE INVENTION

The infrared spectrum covers a range of wavelengths longer than the visible wavelengths, but shorter than microwave wavelengths. Visible wavelengths are generally regarded as between 0.4 and 0.75 micrometers. The infrared wavelengths extend from 0.75 micrometers to 1 millimeter. The function of an infrared detector is to respond to the energy of a wavelength within some particular portion of the infrared region.

All materials generate radiant energy having characteristic wavelengths within the infrared spectrum depending on the temperature of the material. Many current infrared image detection systems incorporate arrays with large numbers of discrete, highly sensitive detector elements, the electrical outputs of which are connected to signal processing circuitry. By analyzing the pattern and sequence of detector element excitations, the processing circuitry can identify and track sources of infrared radiation. Though the theoretical performance of such contemporary systems is satisfactory for many applications, it is difficult to construct structures that adequately interface large numbers of detector elements with associated signal processing circuitry in a practical and reliable manner. Consequently, practical applications for contemporary infrared image detector systems have necessitated further advances in the areas of miniaturization of the detector array and accompanying circuitry, of minimization of noise that results in lower sensitivity of the detected signal, of image enhancement and of improvements in the reliability of the image detection system and economical production of detector arrays and the accompanying circuitry.

Contemporary arrays of detectors, useful for some applications, may be sized to include 256 detector elements on a side, or a total of 65,536 detectors, the size of each square detector being approximately 0.009 centimeters on a side, with 0.00127 centimeters spacing between detectors. Such an array would therefore be 2.601 centimeters on a side. Interconnection of such a subarray to processing circuitry would require connecting each of the 65,636 detectors to processing circuitry within a square, a little more than one inch on a side. Each array may, in turn, be joined to other arrays to form an extended array that connects to 25,000,000 detectors or more. As would be expected, considerable difficulties are presented in electrically connecting the detector elements to associated circuitry and laying out the circuitry in a minimal area. The problems of forming processing circuitry in such a dense environment require minimization of the surface area used for the circuitry.

The outputs of the detector elements typically undergo a series of processing steps in order to permit derivation of the informational content of the detector output signal. The more fundamental processing steps, such as preamplification, tuned band pass filtering, clutter and background rejection, multiplexing and noise suppression, are preferably done at a location adjacent the detector array focal plane. As a consequence of such on-focal plane, or up-front signal processing, reductions in size, power and cost of signal processing can be achieved. Moreover, up-front signal processing helps alleviate performance, reliability and economic problems associated with the construction of millions of closely spaced conductors connecting each detector element to further signal processing networks.

An improved signal-to-noise ratio for a highly sensitive infrared image detector array can be obtained by comparing the signal on a given detector element with the signals on neighboring elements. This comparison can be accomplished by transmitting the raw data from each individual detector element to an on-board data processor where comparison of the signals is made. The transmission of such raw data from the detector element array to the on-board data processor necessitates the transmission of large amounts of data and the use of an extensive amount of electronic data processing circuitry.

As such, although the prior art has recognized the need to perform comparisons among infrared detector outputs, the proposed solutions have to date been ineffective in providing an economical means of signal data processing.

SUMMARY OF THE INVENTION

The present invention comprises a detector element signal comparator for comparing the output of any detector signal processor within a module to the output of any other detector within the same module to facilitate noise reduction and image enhancement. The detector element signal comparator system has a comparator for each detector signal processor, a comparator bus to connect the output of any detector signal processor to the comparators of all other detector signal processors, a switch for each detector signal processor to selectively connect each detector signal processor to the comparator bus, and an output bus for communicating the comparator signal from the detector element signal comparator to the next stage of signal processing.

The detector element signal comparator system is constructed as an integrated circuit. It is mounted on the focal plane within a cavity in the module upon which the detector elements are mounted. Mounting the detector element signal comparator system on the focal plane array reduces the complexity of the required off-focal-plane-array signal processing equipment. It also lowers the amount of raw data that must be transmitted from the focal plane.

An improved signal-to-noise ratio for the imaging detector array is obtained by comparing the signal on a given detector element with the signals on adjacent elements. The use of a comparator circuit for each detector element on the focal plane enables the amount of noise in the detector signals to be reduced, and so to increase the signal-to-noise ratio.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The detector element signal comparator system of the present invention is illustrated in FIGS. 1-6 of the drawings which depict a presently preferred embodiment of the invention.

Figure 1:
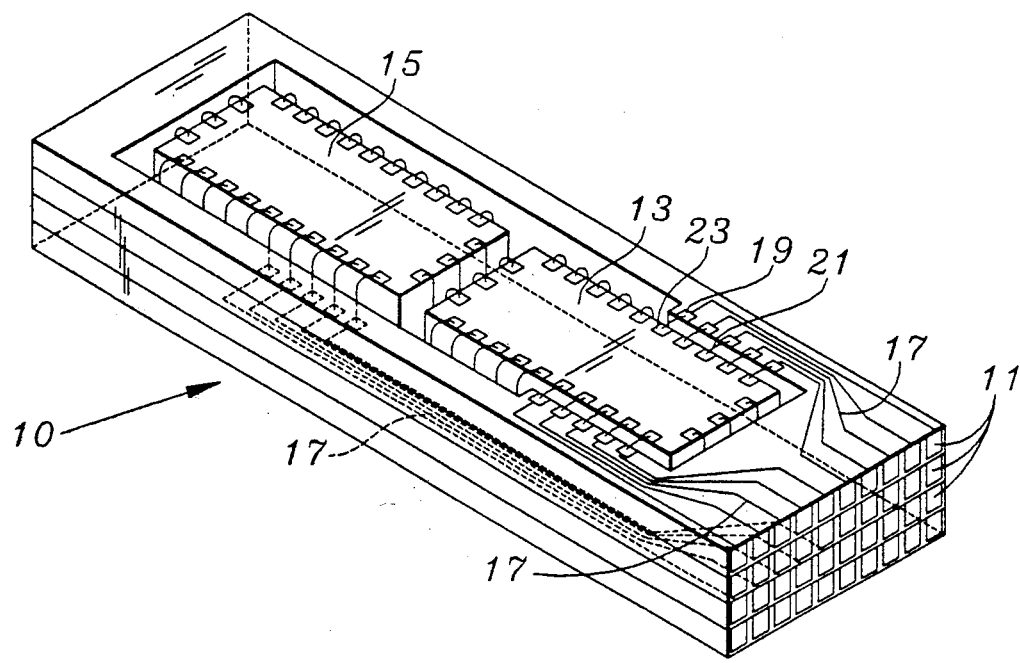
FIG. 1 is a perspective view of a single infrared staring, area array detector module showing the detector element contact pads and the integrated signal processing circuit chips mounted within the module.

Referring now to FIG. 1, a module 10 constructed of plastic, adhesively bonded layers of ceramic or another suitable material has a plurality of bonding pads 11 for contacting infrared detector elements 11 mounted in a two dimensional array upon one surface thereof, and first and second integrated circuit (IC) chips, 13 and 15, respectively, mounted therewithin. Signal processing and comparator circuitry may be formed upon the first and second IC's to provide on-focal-plane signal processing and comparison.

Figure 2:
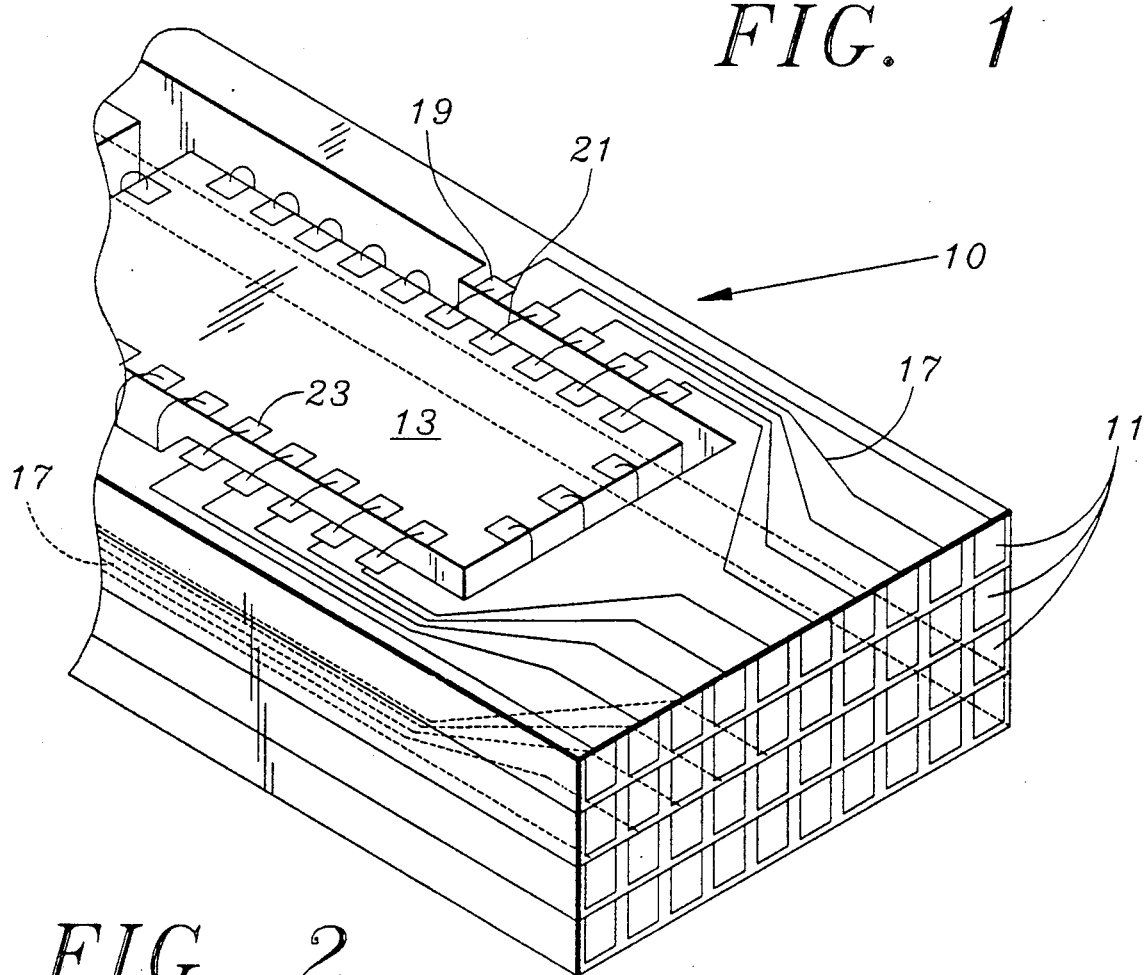
FIG. 2 is an enlarged view of the detector module of FIG. 1 showing the electrical connections of the detector elements to the integrated circuit.

As is shown in FIG. 2, electrical connectors 17, which may be either printed metal film leads, wires or conductive conduits formed upon the surface of a layer which can be a printed circuit board, electrically connect the detector element contact pads 11, row-by-row, to module pads 19. Leads 21, which may be wires or tab strips, electrically connect module pads 19 to IC pads 23, which provide electrical connection to one or more die within the first and second signal processing IC's 13 and 15 respectively. Signal processing and comparator circuitry may be formed upon the chip substrates by conventional wafer fabrication techniques. The signal processing circuitry conditions the output of the detector elements for further processing off the focal plane assembly. The IC chip processing can include signal preamplification, filtering and integration. The comparator circuit compares the output of a first selected detector element at a pad 11 with the output of any other selected detector element at another pad 11.

The use of comparators to compare the outputs of detector elements provides a means both to reduce noise and to enhance image quality. A variety of noise reduction techniques rely upon the comparison of a detector element signal with a multiplicity of adjacent detector signals to distinguish between a signal and random background noise or to sharpen an image by increasing the signal-to-noise ratio.

Also fixed pattern noise can be reduced by imaging a uniform dark background and then compensating for variation among detector outputs. This can be done by comparing each detector element to its surrounding elements and generating an offset associated with each element which is dependent upon the variation of that element from its surrounding elements.

Image enhancement is possible since constant real signals, such as the earth's corona effect can be subtracted from the total image. For example, since the earth's corona remains fixed in the image of the staring array, it can be removed from the signal by comparing detector elements to determine those upon which the corona image is found. Removal of the corona results in a more constant background against which targets may be more easily tracked.

Figure 3:
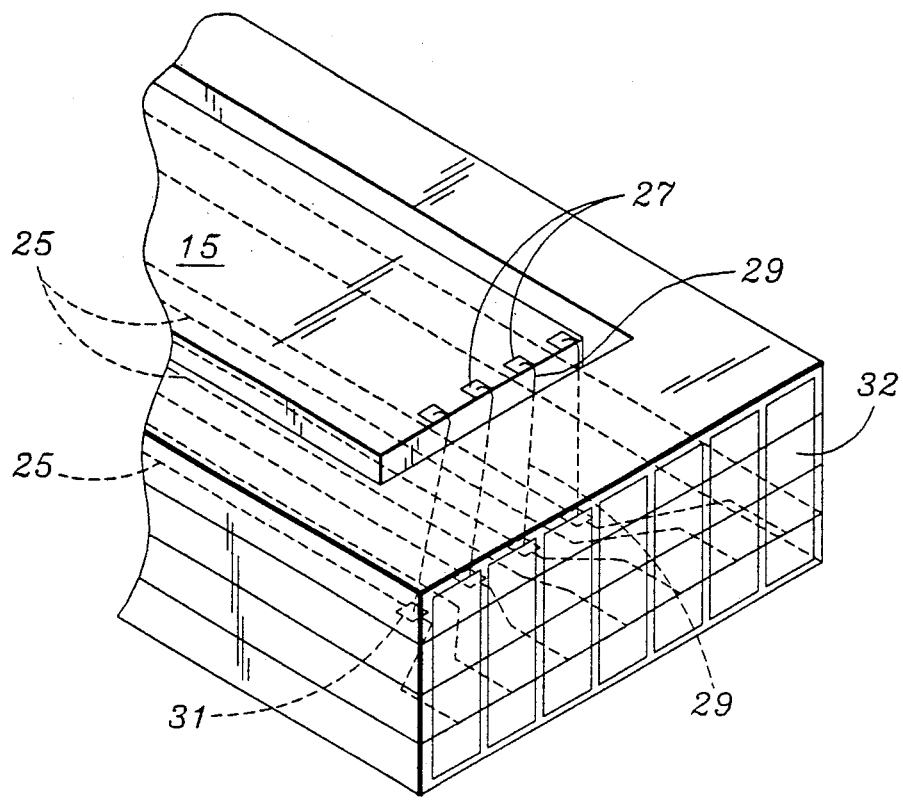
FIG. 3 is an enlarged view of the opposite end of the detector module to that shown in FIG. 2, showing the connections of the integrated circuit to the module bus.

Referring now to FIG. 3, electrical connections between the second signal processing IC 15 and the module bus leads 25 are depicted. These connections include chip pads 27, wires or strips 29 and layer pads 31. Similar electrical connections are provided for the first signal processing IC 13, not shown. Electrical signals such as detector outputs, clock, addressing, power, and ground are communicated via the module bus leads 25. These leads are connected to bonding pads 32.

The use of a module 10 to house and to provide electrical interconnection for comparator circuitry facilitates on-focal-plane detector element comparison. This reduces the work load on an off-the-focal-plane, on-board data processor by allowing it to receive signal enhanced data. Since the on-board data processor doesn't have to waste its resources for noise reduction, it can be used to run less elaborate acquisition and tracking algorithms. The on-board data processor has only to specify the specific comparisons to be performed at the focal plane. The specification of comparisons can be a part of an acquisition and tracking algorithm.

Figure 4:
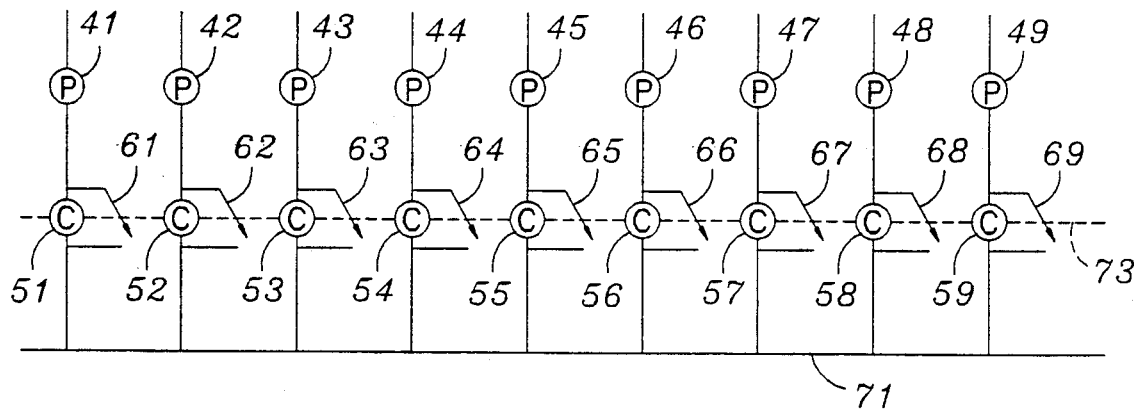
FIG. 4 is a block diagram of the detector element signal comparator network of the present invention.

Referring now to FIG. 4, the detector element signal comparator circuit for noise reduction and image enhancement is depicted. Detector signal processors 41-49 perform such functions as amplification, normalization, filtering and integration of the detector element signals prior to the signals being transmitted to a remote processor. The signal processors 41-49 transmit signals to the comparators 51-59. Comparator outputs are fed to output bus 73, when the comparator is addressed for its output.

Alternatively, a processor output can bypass its comparator by a switch 61-69 and be connected to a comparator input bus 71. Thus, each comparator has two input ports through which its dedicated detector input can be compared to any other detector input.

The first input port always receives a processed detector input signal for its dedicated channel, which is the output of its associated signal processing circuitry such processors 41-49. The second input port is connected to the input bus 71 and will receive as an input any detector processor signal placed on the comparator input bus 71.

The output of each signal processor 41-49 is read by addressing its corresponding comparator 51-59. Addressing its comparator puts the output of that comparator on the output bus 73. As long as each of the bypass switches 61-69 are open, the output of each comparator comprises only the output of its single corresponding signal processor 41-49. Consequently, no comparison with another channel is made. Thus, a basic image consisting of uncompared detector processed signals is provided to the on-board data processor. Such an image may be used, for example, when no noise reduction nor image enhancement is needed or it is desired to switch rapidly to a different set of detector channels.

Figure 5:
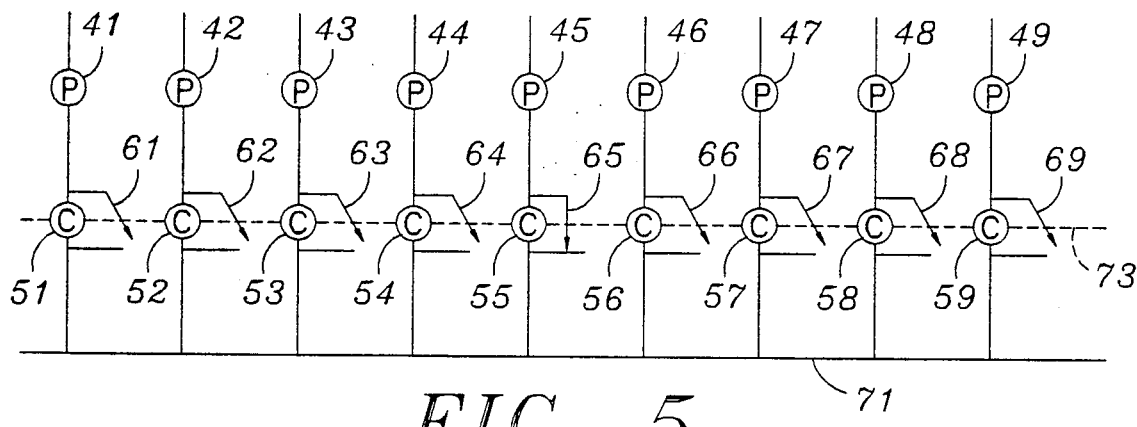
FIG. 5 is a block diagram of the detector element signal comparator of the present invention showing the output of the center signal processor being connected to the comparator bus.

Referring now to FIG. 5, bypass switch 65 has been closed to provide the output of signal processor 45 directly to the comparator input bus 71 from which the output of signal processor 45 is then input to all of the other comparators 51-54, and 56-59. By addressing any of the other comparators 51-54, or 56-59 the output of the addressed comparator is placed upon the output bus 73. The output of the addressed comparator is then a comparison of the output of signal processor 45 and the output of the signal processor of the addressed comparator.

For example, if comparator 51 is addressed then its output will be placed upon the output bus 73. The output of comparator 51 will consist of a signal representative of the comparison of the output of signal processor 41 to the output of signal processor 45. This occurs since comparator 51 receives an input from signal processor 41 and in this case also receives an input from signal processor 45 because switch 65 is closed.

Figure 6:
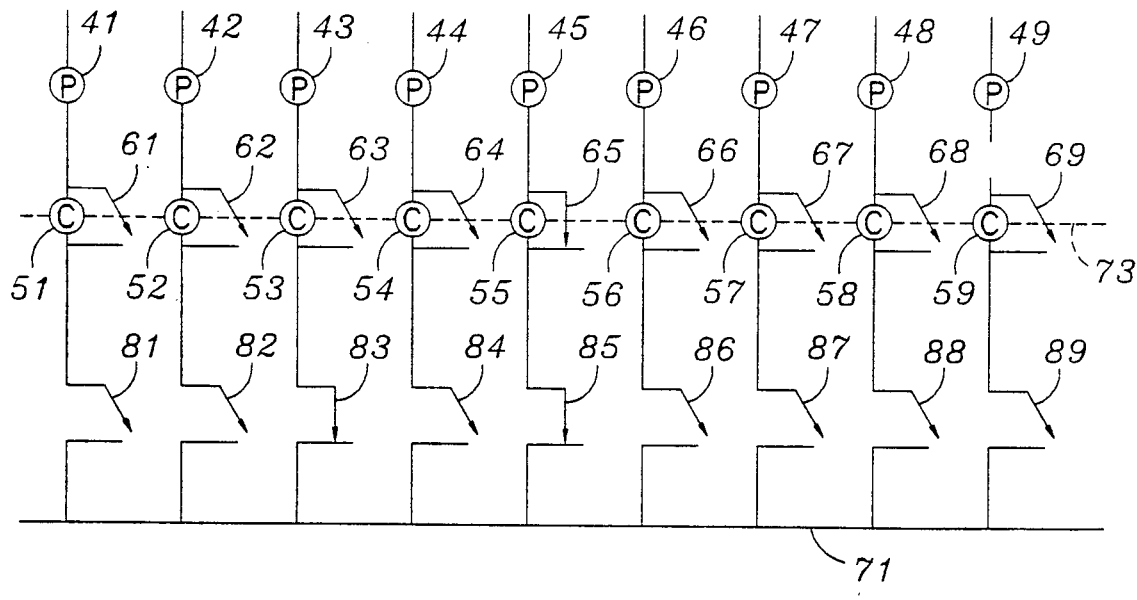
FIG. 6 is a block diagram of the detector element signal comparator depicting the addition of switches for isolating those comparators which are not being used in order to reduce capacitive loading of the input bus by the unused comparators.

Referring now to FIG. 6, isolation switches 81-89 isolate those comparators which are not being used from the comparator bus to eliminate capacitive loading. Permitting the comparator input bus 71 to be continuously connected to each of the comparators 51-59 permits each of those comparators to contribute to the capacitive loading of the comparator input bus 71. Removing those comparators which are not being used causes the comparator input bus 71 to supply a signal to only the comparator being used at any given time. Capacitive loading of the capacitive bus reduces the amplitude of the processor signal carried thereon, resulting in an incorrect comparison.

For example, in FIG. 6 the output of signal processor 45 is being compared to the output of signal processor 43. The output of signal processor 45 is supplied to comparator 53 via the comparator input bus 71 since bypass switch 65 and isolation switches 83 and 85 are all closed. Each of the other isolation switches 81, 82, 84 and 86-89 is open. This prevents comparators 51, 52, 54 and 56-59 from contributing to the capacitive loading of the comparator input bus 71.

The detector elements to be compared can be selected based upon an algorithm or a set of instructions which systematically selects detector element signals for comparison. The algorithm can compare each detector element to the one below it in the array, for instance. Alternatively, each detector element could be compared to each adjacent detector element. Various combinations are available.

The outputs of the detector elements themselves could be used to select detector element signals for comparison. For instance, assume the detected image is a bright round spot against a dark background. Each detector element sensing black which is located adjacent a detector element which is sensing brightness could be compared to each of its adjacent detector elements. The comparator outputs could then be used to better define the image by more precisely determining the boundary of the bright spot.

It is understood that the exemplary detector signal comparator system described herein and shown in the drawings represents only a presently preferred embodiment of the invention. Indeed, various modifications and additions may be made to such embodiment without departing from the spirit and scope of the invention. For example, the comparison of detector element outputs need not be limited to detectors within a particular module but can be extended to all detectors within a focal plane array. Also, comparison of the detector element outputs can occur prior to the first stage of signal processing, thereby providing a comparison of raw detector outputs. Thus, these and other modifications and additions may be obvious to those skilled in the art and may be implemented to adapt the present invention for use in a variety of different applications.

What is claimed is:

1. A noise reduction circuit for an infrared detector module having a plurality of infrared detector elements, the circuit comprising:
    (a) a comparator circuit contained within the module and in electrical communication with said detector elements; and
    (b) wherein said comparator circuit is operative to compare an output from a first selected detector element to an output from any other selected detector element of the module.

2. The circuit as recited in claim 1 wherein the comparator circuit comprises:
    (a) a plurality of comparators, the number of comparators substantially conforming to the number of detector elements, each comparator connected to a dedicated detector element and connectable to any other detector element;
    (b) a comparator input bus connectable to each comparator and connectable to each detector element for selectively connecting the output of any detector element to any of the comparators; and
    (c) a plurality of first switches for connecting the detector elements to said comparator input bus.

3. The circuit as recited in claim 2 further comprising a comparator output bus connectable to each of the comparators.

4. The circuit as recited in claim 3 further comprising a plurality of second switches for connecting a selected comparator to the comparator input bus.

5. The circuit as recited in claim 4 further comprising signal processing circuitry for conditioning the output of said detector elements for further processing at a remote location, said signal processor electrically connected intermediate each of the detector elements and said comparator circuit.

6. The circuit as recited in claim 5 wherein the output of the comparator circuit is representative of the difference in amplitudes of the compared detector element signals.

7. The circuit as recited in claim 6 wherein the output signal of said comparator circuit is operated upon by a noise reduction algorithm to reduce the noise component of the compared detector element signals.

8. The circuit as recited in claim 7 wherein the algorithm systematically selects detector element signals to be compared.

9. The circuit as recited in claim 7 wherein the selection of detector element signals to be compared is dependent upon the detected image.

10. A comparator circuit for use with a detector array, said detector array having a plurality of detector elements, the comparator circuit comprising:
   (a) a plurality of comparators, the number of comparators substantially conforming to the number of detector elements, each comparator having first and second input ports, the first input port being connected to an associated detector element and the second input port being connectable to any other detector element;
   (b) a comparator input bus connectable to the second input port of each comparator; and
   (c) a plurality of first switches for shorting the comparator to selectively connect said detector elements to said comparator input bus.

11. The comparator circuit as recited in claim 10 further comprising a plurality of second switches for selectively connecting the comparator input bus to the comparator second input ports.

12. A method for reducing the noise content of signals output from a plurality of detector elements comprising the steps of:
   (a) receiving output signals from a plurality of detector elements;
   (b) connecting a first selected detector element signal to a first of a plurality of comparators;
   (c) connecting a second selected detector element signal to a comparator input bus, the comparator input bus being connectable to each of the comparators;
   (d) connecting the first comparator to the input bus;
   (e) comparing the first and second detector element signals input to the comparator; and
   (f) outputting a signal representative of the comparison onto an output bus.

13. The method as recited in claim 12 further comprising the step of selectively connecting the comparator to the comparator input bus with a switch, such that only the comparator with which the first and second detector element signals are to be compared is connected to the comparator input bus.

14. The method as recited in claim 13 wherein the steps of connecting a first selected detector element signal to a comparator and connecting a second selected detector element signal to a comparator input bus are performed according to an algorithm which systematically selects detector element signals to be compared.

15. The method as recited in claim 10 wherein the steps of connecting a first selected detector element signal to a comparator and connecting a second selected detector element signal to a comparator input bus are dependent upon the detector element signals, the detector element signals determining which detector element signals are to be compared.

16. The method as recited in claim 13 further comprising the step of applying a noise reduction algorithm to the output signal representative of the comparison to eliminate extraneous signal components.

17. The method as recited in claim 16 further comprising the step of applying an image enhancement algorithm to the output signal after application of the noise reduction algorithm to aid in target acquisition and tracking by making the target more distinguishable from the background.

* * * * *